(12) United States Patent
Honda et al.

(10) Patent No.: US 7,534,502 B2
(45) Date of Patent: May 19, 2009

(54) ZINC-PLATED STEEL SHEET EXCELLENT IN CORROSION RESISTANCE AFTER COATING AND CLARITY OF COATING THEREON

(75) Inventors: Kazuhiko Honda, Kimitsu (JP); Akira Takahashi, Kimitsu (JP); Yoshihiro Suemune, Kimitsu (JP); Hidetoshi Hatanaka, Kimitsu (JP); Tsuyoshi Miyake, Kimitsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/501,188

(22) PCT Filed: Jan. 8, 2003

(86) PCT No.: PCT/JP03/00071

§ 371 (c)(1), (2), (4) Date: Jul. 8, 2004

(87) PCT Pub. No.: WO03/060179

PCT Pub. Date: Jul. 24, 2003

(65) Prior Publication Data

US 2004/0258949 A1 Dec. 23, 2004

(30) Foreign Application Priority Data

Jan. 9, 2002 (JP) ............................. 2002-002486
Jun. 11, 2002 (JP) ............................. 2002-170509

(51) Int. Cl.
  *B32B 15/00* (2006.01)
(52) U.S. Cl. ...................................... 428/659
(58) Field of Classification Search .................. 428/659
  See application file for complete search history.

(56) References Cited

U.S. PATENT DOCUMENTS 6,465,114 B1 * 10/2002 Honda et al. ................ 428/659

FOREIGN PATENT DOCUMENTS

| EP | 0412073 | | 2/1991 |
|---|---|---|---|
| JP | 05015901 | | 1/1993 |
| JP | 07316763 | | 12/1995 |
| JP | 07316763 A | * | 12/1995 |
| JP | 09-263967 | * | 10/1997 |
| JP | 2000064061 | | 2/2000 |
| JP | 2000104154 | | 4/2000 |
| JP | 3179446 | | 4/2001 |
| JP | 2001295018 | | 10/2001 |
| JP | 2001329383 | | 11/2001 |

\* cited by examiner

*Primary Examiner*—Timothy M Speer
*Assistant Examiner*—Gordon R Baldwin
(74) *Attorney, Agent, or Firm*—Baker Botts LLP

(57) ABSTRACT

The object of the present invention is to provide a plated steel sheet capable of securing excellent post-painting corrosion resistance and brightness, and the present invention makes it possible to produce a plated steel sheet excellent in post-painting corrosion resistance and paint coat image clarity by further adding one or more elements selected from among 0.01 to 0.5% of Ca, 0.01 to 0.2% of Be, 0.0001 to 0.2% of Ti, 0.1 to 10% of Cu, 0.001 to 0.2% of Ni, 0.01 to 0.3% of Co, 0.0001 to 0.2% of Cr and 0.01 to 0.5% of Mn, in mass, to the plated layer of the plated steel sheet which is characterized in that the center line average roughness Ra of the Zn alloy plated steel sheet is 1.0 μm or less and the filtered waviness curve $W_{CA}$ thereof is 0.8 μm or less, the Zn alloy plated steel sheet having on the surface thereof the plated layer containing 1 to 10% of Mg, 2 to 19% of Al and 0.001 to 2% of Si in mass and other elements the total amount of which is suppressed to 0.5% or less in mass, with the balance consisting of Zn.

6 Claims, No Drawings

ZINC-PLATED STEEL SHEET EXCELLENT IN CORROSION RESISTANCE AFTER COATING AND CLARITY OF COATING THEREON

CROSS-REFERENCE TO RELATED APPLICATION(S)

The application is a national phase application of International Patent Application No. PCT/JP03/00071, filed on Jan. 8, 2003, and which published on Jul. 24, 2003 as International Patent Publication No. WO 03/060179. Accordingly, the present application claims priority from the above-referenced International application under 35 U.S.C. § 365. In addition, the present application claims priority from Japanese Patent Application Nos. 2002-002486 and 2002-170509, filed Jan. 9, 2002 and Jun. 11, 2002, respectively, under 35 U.S.C. § 119. The entire disclosures of these International and Japanese patent applications are incorporated herein by reference.

FIELD OF THE INVENTION

The present invention relates to a plated steel sheet and, more specifically, to a plated steel sheet having a particular post-plating corrosion resistance and post-plating brightness and applicable to various applications such as home electric appliances, automobiles and building materials.

BACKGROUND INFORMATION

Example of plated steel sheets most commonly recognized as having a good corrosion resistance are galvanized-type steel sheets. Such galvanized-type steel sheets are used in various manufacturing industries including the fields of automobiles, home electric appliances and building materials and most of them are used, after being painted, from the viewpoint of corrosion resistance and designability.

In order to improve the corrosion resistance of such galvanized-type steel sheets, it is possible to use Zn—Al—Mg—Si hot dip plated steel sheets as described in Japanese Patent No. 3179446. Further, Japanese Patent Publication No. 2000-064061 describes that a painted steel sheet more excellent in corrosion resistance can be obtained by adding one or more elements of Ca, Be, Ti, Cu, Ni, Co, Cr and Mn to such a proposed Zn—Al—Mg—Si hot dip plated steel sheet. Furthermore, Japanese Patent Publication No. 2001-295015 describes the fact that a surface appearance can be improved by adding Ti, B and Si to a Zn—Al—Mg hot dip plated steel sheet.

However, with the above-described conventional and other known plated steel sheets, sufficient corrosion resistance and paint coat image clarity may not be secured, e.g., in the case where they are used after being processed and painted.

SUMMARY OF THE INVENTION

One of the objects of the present invention is to provide a plated steel sheet excellent in post-painting corrosion resistance and paint coat image clarity by solving the aforementioned problems. In view of such object of the invention, and based on research and development of a plated steel sheet excellent in post-painting corrosion resistance and paint coat image clarity, it has been determined that the paint coat image clarity may be improved by controlling the center line average roughness Ra of a steel sheet, which has a galvanized layer containing Mg of 1 to 10%, Al of 2 to 19% and Si of 0.001 to 2% in mass, to 1.0 μm or less and the filtered waviness curve $W_{CA}$ thereof to 0.8 μm or less. In addition, the post-painting corrosion resistance may further be improved by adding one or more elements of Ca, Be, Ti, Cu, Ni, Co, Cr and Mn into the galvanized layer and optimizing the addition amounts.

According to one exemplary embodiment of the present invention, a galvanized steel sheet excellent in post-painting corrosion resistance and paint coat image clarity may be provided. For example, the center line average roughness Ra of the steel sheet is 1.0 μm or less and the filtered waviness curve $W_{CA}$ thereof is 0.8 μm or less, the steel sheet having on the surface thereof a galvanized layer containing 1 to 10% of Mg, 2 to 19% of Al and 0.001 to 2% of Si in mass with the balance consisting of Zn and unavoidable impurities.

Such galvanized steel sheet may also contain one or more elements of 0.01 to 0.5%, Be of 0.01 to 0.2%, Ti of 0.0001 to 0.2%, Cu of 0.1 to 10%, Ni of 0.001 to 0.2%, Co of 0.01 to 0.3%, Cr of 0.0001 to 0.2% and Mn of 0.01 to 0.5% in mass. The plated layer may have a metallographic structure, in which an [$Mg_2Si$ phase], a [$Zn_2Mg$ phase] and a [Zn phase] can coexist in the substrate of an [Al/Zn/$Zn_2Mg$ ternary eutectic structure]. Further, the plated layer may have a metallographic structure, in which an [$Mg_2Si$ phase], a [$Zn_2Mg$ phase] and an [Al phase] coexist in the substrate of an [Al/Zn/$Zn_2Mg$ ternary eutectic structure]. The plated layer having a metallographic structure may also be provided such that an [$Mg_2Si$ phase], a [$Zn_2Mg$ phase], a [Zn phase] and an [Al phase] coexist in the substrate of an [Al/Zn/$Zn_2Mg$ ternary eutectic structure]. Additionally, the plated layer has a metallographic structure, such that an [$Mg_2Si$ phase], a [Zn phase] and an [Al phase] coexist in the substrate of an [Al/Zn/$Zn_2Mg$ ternary eutectic structure].

The entire disclosures of all publications referenced above are incorporated herein by reference.

DETAILED DESCRIPTION

A galvanized steel sheet according to an exemplary embodiment of the present invention may be a galvanized steel sheet characterized in that the center line average roughness Ra (e.g., JIS B0601) of the galvanized steel sheet is 1.0 μm or less and the filtered waviness curve $W_{CA}$ (e.g., JIS B0601) thereof is 0.8 μm or less, the galvanized steel sheet having a galvanized layer containing Mg of 1 to 10%, Al of 2 to 19% and Si of 0.001 to 2% in mass.

One of the reasons for limiting the Mg content to 1 to 10% in mass is that, when the Mg content is less than 1% in mass, the effect of improving corrosion resistance is insufficient and, when it can exceed 10% in mass, the galvanized layer embrittles and the adhesiveness deteriorates.

One of the reasons for limiting the Al content to 2 to 19% in mass is that, when the Al content is less than 2% in mass, the galvanized layer embrittles and the adhesiveness deteriorates and, when it exceeds 19% in mass, the effect of improving corrosion resistance may disappear.

One of the reasons for limiting the Si content to 0.001 to 2% in mass is that, when the Si content is less than 0.001% in mass, Al in the galvanized layer reacts with Fe in the steel sheet, the galvanized layer embrittles and the adhesiveness deteriorates and, when it exceeds 2% in mass, the effect of improving adhesiveness may disappear One of the reasons for limiting the Ra value to 1.0 μm or less is that, when it exceeds 1.0 μm, the paint coat image clarity deteriorates. The reason for limiting the $W_{CA}$ value to 0.8 μm or less is that, when it exceeds 0.8 μm, the paint coat image clarity may deteriorate. The lower limits of Ra and $W_{CA}$ values are not particularly regulated because the paint coat image clarity improves as the values of Ra and $W_{CA}$ fall.

However, it is substantially difficult to stably obtain Ra and $W_{CA}$ values of 0.01 μm or less on an industrial scale.

According to an exemplary embodiment of the present invention, a method is provided for imposing roughness on a plated surface which is not limited in any manner. Indeed, any method is acceptable as far as the expressions Ra<1.0 μm and $W_{CA}$≦0.8 μm are obtained. For example, skin-pass rolling or the like, in which rolls adjusted to Ra≦1.0 μm and $W_{CA}$≦0.8 μm by applying laser dull machining or electrical dishcharge dull machining are used, can be employed.

In order to further improve post-painting corrosion resistance, one or more elements selected from among Ca, Be, Ti, Cu, Ni, Co, Cr and Mn may be added. The reasons why the addition of those elements causes the post-painting corrosion resistance to improve may be that:

a. the fine jogs formed on the surface of a galvanized layer make the anchor effect on a painted film increase;

b. the addition of the elements makes fine micro-cells form in a galvanized layer and improves the reactivity and adhesiveness to a chemical conversion coating; and c. the addition of the elements stabilizes corrosion products in a galvanized layer and delays the corrosion of the galvanized layer under a painted film.

The effect of further improving post-painting corrosion resistance is shown conspicuously when the contents of Ca, Be, Ti, Cu, Ni, Co, Cr and Mn are 0.01% or more, 0.01% or more, 0.0001% or more, 0.1% or more, 0.001% or more, 0.01% or more, 0.0001% or more and 0.01% or more in mass, respectively, and therefore the respective lower limits are set at those figures.

When the addition amounts increase, the surface appearance after plating becomes coarse and a poor appearance occurs due to the deposition of, for example, dross or oxide and, therefore, the upper limits of the elements Ca, Be, Ti, Cu, Ni, Co, Cr and Mn are set at 0.5%, 0.2%, 0.2%, 1.0%, 0.2%, 0.3%, 0.2% and 0.5% in mass, respectively.

Further, the addition of one or more elements selected from among Ca, Be, Ti, Cu, Ni, Co, Cr and Mn is effective also for the fractionalization of the crystals in a plated layer and therefore it is estimated that the addition of those elements lowers the surface roughness and contributes also to the improvement of paint coat image clarity.

Besides those elements, Fe, Sb, Pb and Sn may be contained individually or in combination by 0.5% or less in mass in a galvanized layer. Further, even when P, B, Nb, Bi and the third group elements are contained at 0.5% or less in mass in total, the effect of the present invention is not hindered and rather, in some favorable cases, formability is further improved depending on the addition amount.

According to an exemplary embodiment of the present invention, in order to obtain a galvanized steel sheet further excellent in corrosion resistance, it may be desirable to further increase the addition amounts of Si, Al and Mg and to form a metallographic structure wherein an [$Mg_2Si$ phase] is mixed in the solidification structure of a galvanized layer. It is possible to further improve corrosion resistance by increasing the addition amounts of Al, Mg and Si and forming a metallographic structure wherein an [$Mg_2Si$ phase] is mixed in the solidification structure of a plated layer. To that end, it may be preferable to control an Mg content to 2% or more and an Al content to 4% or more in mass.

A plated layer according to an exemplary embodiment of the present invention can be mainly composed of a quaternary alloy of Zn—Mg—Al—Si. In such case, when the amounts of Al and Mg are relatively small, the material shows a behavior similar to a binary alloy of Zn—Si in the early stages of solidification and primary crystals of Si type crystallize. Thereafter, the material shows a solidification behavior similar to a ternary alloy of Zn—Mg—Al composed of the remainder. That is, after an [Si phase] crystallizes primarily, a metallographic structure containing one or more of a [Zn phase], an [Al phase] and a [$Zn_2Mg$ phase] in the substrate of an [Al/Zn/$Zn_2Mg$ ternary eutectic structure] forms.

Then, when the amounts of Al and Mg increase to particular amounts, the material may show a behavior similar to a ternary alloy of Al—Mg—Si in the early stages of solidification and primary crystals of $Mg_2Si$ type crystallize. Thereafter, the material can display a solidification behavior similar to a ternary alloy of Zn—Mg—Al composed of the remainder. For example, after an [$Mg_2Si$ phase] crystallizes primarily, a metallographic structure containing one or more of a [Zn phase], an [Al phase] and a [$Zn_2Mg$ phase] in the substrate of an [Al/Zn/$Zn_2Mg$ ternary eutectic structure] forms.

In this manner, an [Si phase] is the phase that looks like an island having a clear boundary in the solidification structure of a plated layer, for example, the phase that corresponds to primary crystal Si in a Zn—Si binary phase equilibrium diagram. In certain cases, a small amount of Al may dissolve in the phase and thus, as long as it is observed in the phase diagram, it is possible that Zn and Mg do not dissolve or, even if they dissolve, their dissolved amounts are very small. In such case, the [Si phase] can be clearly identified in the plated layer under microscopic observation.

Further, an [$Mg_2Si$ phase] can be the phase that looks like an island having a clear boundary in the solidification structure of a plated layer, for example, the phase that corresponds to primary crystal $Mg_2Si$ in an Al—Mg—Si ternary phase equilibrium diagram. As long as it is observed in the phase diagram, it is estimated that Zn and Al do not dissolve or, even if they dissolve, the dissolved amounts may be relatively very small. In this case, the [$Mg_2Si$ phase] can be clearly identified in the plated layer under microscopic observation.

Furthermore, an [Al/Zn/$Zn_2Mg$ ternary eutectic structure] can be the ternary eutectic structure comprising an [Al phase], a [Zn phase] and an [intermetallic compound $Zn_2Mg$ phase]. The [Al phase] which composes the ternary eutectic structure corresponds to, for example, an [Al" phase] (an Al solid solution that contains Zn in the state of a solid solution and includes a small amount of Mg) at a high temperature in an Al—Zn—Mg ternary phase equilibrium diagram. An [Al" phase] at a high temperature usually appears in the state of separating into a fine Al phase and a fine Zn phase at an ordinary temperature. Further, the Zn phase in the ternary eutectic structure contains a small amount of Al in the state of a solid solution and, in some cases, is a Zn solid solution wherein a small amount of Mg is dissolved further. The $Zn_2Mg$ phase in the ternary eutectic structure is an intermetallic compound phase existing in the vicinity of the point indicated at about 84% in mass of Zn in the Zn—Mg binary phase equilibrium diagram. When it is observed in the phase diagram, it is likely that Si dissolves or does not in each phase or, even if it dissolves, the dissolved amount is very small. However, as the very small dissolved amount may not be clearly identified with an ordinary analysis, the ternary eutectic structure composed of the three phases is expressed by the term [Al/Zn/Zn$_2$Mg ternary eutectic structure] according to the present invention.

Further, an [Al phase] is a phase that looks like an island having a clear boundary in the substrate of the aforementioned ternary eutectic structure and the phase corresponds to, for example, an [Al" phase] (an Al solid solution that contains Zn in the state of a solid solution and includes a small amount of Mg) at a high temperature in an Al—Zn—Mg ternary phase equilibrium diagram. In an Al" phase at a high temperature, the amounts of dissolved Zn and Mg can vary in accordance with the concentrations of Al and Mg in a plating bath. An Al" phase at a high temperature usually separates into a fine Al phase and a fine Zn phase at an ordinary temperature and it is reasonably estimated that the island shape observed at an ordinary temperature is the residue of the Al" phase at a high temperature.

When it is observed in the phase diagram, it is estimated that Si dissolves or does not dissolve in the phase or, even if it dissolves, the dissolved amount is very small. However, as a very small dissolved amount cannot clearly be identified with an ordinary analysis, the phase that derives from the Al" phase (called Al primary crystals) at a high temperature and retains the shape of the Al" phase is called an [Al phase] according to the present invention. In this case, the [Al phase] can clearly be distinguished from the Al phase composing the aforementioned ternary eutectic structure under microscopic observation.

Still further, a [Zn phase] is the phase that looks like an island having a clear boundary in the substrate of the aforementioned ternary eutectic structure and, in some actual cases, a small amount of Al and, further, a small amount of Mg, may dissolve in the phase. When it is observed in the phase diagram, Si likely does not dissolve in the phase or, even if it dissolves, the dissolved amount is very small. In this case, the [Zn phase] can clearly be distinguished from the Zn phase composing the aforementioned ternary eutectic structure under microscopic observation.

Yet further, a [Zn$_2$Mg phase] is the phase that looks like an island having a clear boundary in the substrate of the aforementioned ternary eutectic structure and, in some actual cases, a small amount of Al may dissolve in the phase. When it is observed in the phase diagram, it is estimated that Si does not dissolve in the phase or, even if it dissolves, the dissolved amount is likely very small. In this case, the [Zn$_2$Mg phase] can clearly be distinguished from the Zn$_2$Mg phase composing the aforementioned ternary eutectic structure under microscopic observation.

According to one exemplary embodiment of the present invention, though the crystallization of an [Si phase] does not particularly influence the improvement of corrosion resistance, the crystallization of a [primary crystal Mg$_2$Si phase] likely contributes to the improvement of corrosion resistance. The contribution is likely caused by the facts that Mg$_2$Si is very active and that Mg$_2$Si reacts with water and is decomposed in a corrosive environment, protects a metallographic structure, wherein one or more of a [Zn phase], an [Al phase] and a [Zn$_2$Mg phase] are contained in the substrate of an [Al/Zn/Zn$_2$Mg ternary eutectic structure], from corrosion in a sacrificial manner, simultaneously forms a protective film by the produced Mg hydroxide, and suppresses further progress of corrosion.

Further, when one or more elements of Ca, Be, Ti, Cu, Ni, Co, Cr and Mn are added to a Zn—Mg—Al—Si quaternary alloy, some of the elements dissolve and some other elements form intermetallic compounds by combining with Zn, Al, Mg and the added elements. However, with the addition amounts in the ranges stipulated in the present invention, it is difficult to clearly identify the shapes by an ordinary analysis method and for that reason their addition amounts are not particularly defined.

Though the deposition amount of plating is not particularly regulated, a desirable amount is 10 g/m$^2$ or more from the viewpoint of corrosion resistance and 350 g/m$^2$ or less from the viewpoint of workability.

According to another exemplary embodiment of the present invention, a method is provided for producing a plated steel sheet is not particularly regulated and an ordinary non-oxidizing furnace type hot dip plating method can be applied. In the case of applying Ni pre-plating as a lower layer too, an ordinarily employed pre-plating method may be applied and a preferable method after the Ni pre-plating is to apply rapid low-temperature heating in a non-oxidizing or reducing atmosphere and thereafter to apply hot dip plating. The present invention is explained further below using of the examples, as follows.

EXAMPLE 1

Firstly, cold-rolled steel sheets 0.8 mm in thickness were prepared, and subjected to hot dip plating for three seconds at 400 to 500° C. in a Zn alloy plating bath wherein the amounts of added elements were changed, to N$_2$ wiping for adjusting the plated amount to 70 g/m$^2$, and to skin-pass rolling with rolls the roughness of which was changed. The chemical compositions of the plated layers and the surface roughness of the plated steel sheets thus produced are shown in Table 1.

The values of Ra and W$_{CA}$ were measured under the following measurement conditions with a surface roughness shape measuring instrument (made by Tokyo Seimitsu Co., Ltd.). The roughness was measured at three arbitrary points and the average value was used.
Probe: probe tip 5 μmR
Measurement length: 25 mm
Cutoff: 0.8 mm
Driving speed: 0.3 mm/sec.
Filter: 2CR filter The paint coat image clarity was evaluated by cutting a plated steel sheet to a size of 150 mm×70 mm, subjecting the steel sheet to chemical conversion treatment and painting, and then using a mapping definition measuring instrument (made by Suga Test Instruments Co., Ltd.). A phosphate, at 2 g/m$^2$, was applied as the chemical conversion treatment and cathodic electrodeposition painting to 20 μm and polyester intermediate and finish coats to 35 μm each were applied as the painting. The paint coat image clarity was evaluated by measuring the NSIC and scoring it in accordance with the following criterion. The mark 3 was judged to be acceptable.
3: 85 or more
2: 70 or more to less than 85
1: less than 70

The results of the evaluations are shown in Table 1.

In the cases of Nos. 3 to 5, 8, 11, 14, 17, 20, 23, 26 and 29, the surface roughness was outside the range stipulated in the present invention and therefore the paint coat image clarity was unacceptable. In all the other cases, good paint coat image clarity was obtained.

TABLE 1

| | Hot dip galvanized layer composition (mass %) | | | | | | | | | | Surface roughness | | | |
|---|---|---|---|---|---|---|---|---|---|---|---|---|---|---|
| No. | Mg | Al | Si | Ca | Be | Ti | Cu | Ni | Co | Cr | Mn | Ra | $W_{CA}$ | Brightness | Remarks |
| 1 | 3 | 11 | 0.15 | | | | | | | | | 0.35 | 0.42 | 3 | Invention |
| 2 | 3 | 11 | 0.15 | | | | | | | | | 0.98 | 0.77 | 3 | Invention |
| 3 | 3 | 11 | 0.15 | | | | | | | | | 1.21 | 1.06 | 2 | Comparative |
| 4 | 3 | 11 | 0.15 | | | | | | | | | 1.10 | 0.73 | 2 | Comparative |
| 5 | 3 | 11 | 0.15 | | | | | | | | | 0.88 | 0.91 | 2 | Comparative |
| 6 | 3 | 11 | 0.15 | 0.05 | | | | | | | | 0.55 | 0.49 | 3 | Invention |
| 7 | 3 | 11 | 0.15 | 0.05 | | | | | | | | 0.95 | 0.78 | 3 | Invention |
| 8 | 3 | 11 | 0.15 | 0.05 | | | | | | | | 1.32 | 1.13 | 2 | Comparative |
| 9 | 3 | 11 | 0.15 | | 0.03 | | | | | | | 0.47 | 0.64 | 3 | Invention |
| 10 | 3 | 11 | 0.15 | | 0.03 | | | | | | | 0.96 | 0.77 | 3 | Invention |
| 11 | 3 | 11 | 0.15 | | 0.03 | | | | | | | 1.27 | 1.08 | 2 | Comparative |
| 12 | 3 | 11 | 0.15 | | | 0.03 | | | | | | 0.39 | 0.45 | 3 | Invention |
| 13 | 3 | 11 | 0.15 | | | 0.03 | | | | | | 0.92 | 0.76 | 3 | Invention |
| 14 | 3 | 11 | 0.15 | | | 0.03 | | | | | | 1.40 | 1.12 | 2 | Comparative |
| 15 | 3 | 11 | 0.15 | | | | 0.31 | | | | | 0.43 | 0.51 | 3 | Invention |
| 16 | 3 | 11 | 0.15 | | | | 0.31 | | | | | 0.97 | 0.78 | 3 | Invention |
| 17 | 3 | 11 | 0.15 | | | | 0.31 | | | | | 1.27 | 1.15 | 2 | Comparative |
| 18 | 3 | 11 | 0.15 | | | | | 0.03 | | | | 0.57 | 0.63 | 3 | Invention |
| 19 | 3 | 11 | 0.15 | | | | | 0.03 | | | | 0.96 | 0.78 | 3 | Invention |
| 20 | 3 | 11 | 0.15 | | | | | 0.03 | | | | 1.27 | 1.09 | 2 | Comparative |
| 21 | 3 | 11 | 0.15 | | | | | | 0.04 | | | 0.41 | 0.53 | 3 | Invention |
| 22 | 3 | 11 | 0.15 | | | | | | 0.04 | | | 0.96 | 0.77 | 3 | Invention |
| 23 | 3 | 11 | 0.15 | | | | | | 0.04 | | | 1.28 | 1.17 | 2 | Comparative |
| 24 | 3 | 11 | 0.15 | | | | | | | 0.03 | | 0.52 | 0.46 | 3 | Invention |
| 25 | 3 | 11 | 0.15 | | | | | | | 0.03 | | 0.97 | 0.78 | 3 | Invention |
| 26 | 3 | 11 | 0.15 | | | | | | | 0.03 | | 1.33 | 1.15 | 2 | Comparative |
| 27 | 3 | 11 | 0.15 | | | | | | | | 0.03 | 0.38 | 0.44 | 3 | Invention |
| 28 | 3 | 11 | 0.15 | | | | | | | | 0.03 | 0.93 | 0.78 | 3 | Invention |
| 29 | 3 | 11 | 0.15 | | | | | | | | 0.03 | 1.41 | 1.11 | 2 | Comparative |
| 30 | 4 | 8 | 0.25 | | | | | | | | | 0.38 | 0.43 | 3 | Invention |
| 31 | 5 | 10 | 0.3 | | | | | | | | | 0.45 | 0.57 | 3 | Invention |
| 32 | 6 | 4 | 0.12 | | | | | | | | | 0.52 | 0.61 | 3 | Invention |
| 33 | 5 | 15 | 1.5 | | | | | | | | | 0.64 | 0.49 | 3 | Invention |
| 34 | 1 | 2 | 0.06 | | | | | | | | | 0.76 | 0.52 | 3 | Invention |
| 35 | 3 | 19 | 0.5 | | | | | | | | | 0.81 | 0.60 | 3 | Invention |
| 36 | 3 | 6 | 0.005 | | | | | | | | | 0.39 | 0.42 | 3 | Invention |
| 37 | 3 | 11 | 0.15 | | 0.0002 | | | | | | | 0.44 | 0.56 | 3 | Invention |
| 38 | 3 | 11 | 0.15 | | | | 0.003 | | | | | 0.57 | 0.61 | 3 | Invention |
| 39 | 3 | 11 | 0.15 | | | | | | | 0.0003 | | 0.51 | 0.48 | 3 | Invention |

EXAMPLE 2

First, cold-rolled steel sheets 0.8 mm in thickness were prepared, and subjected to hot dip plating for three seconds at 400 to 500° C. in a Zn alloy plating bath wherein the amounts of added elements were changed, to $N_2$ wiping for adjusting the plated amount to 70 g/m², and to skin-pass rolling with rolls of small roughness so as to control the center line average roughness Ra and the filtered waviness curve $W_{CA}$ of the plated steel sheets to 1.0 μm or less and 0.8 μm or less, respectively. The chemical compositions of the plated layers of the plated steel sheets thus produced are shown in Tables 2 and 3.

The plated steel sheets thus produced were cut into the size of 200 mm×200 mm, stretched by 35 mm by using a punch 100 mm in diameter with a spherical head, and thereafter subjected to chemical conversion treatment, painting and the evaluation of corrosion resistance. A phosphate, at 2 g/m², was applied as the chemical conversion treatment and the cathodic electrodeposition painting of 20 μm and polyester intermediate and finish coats to 35 μm each were applied as the painting.

Further, the painted steel sheets thus produced were scratched, to reached the substrate steel, with a utility knife and then subjected for 120 cycles to CCT comprising 4 hour SST, 2 hour drying and 2 hour humidifying as a sequential cycle. The evaluation was made by applying tape exfoliation test to the scratches after corrosion test and scoring in accordance with the following criterion based on the length of the exfoliation of a painted film. The marks 4 and 5 were judged to be acceptable.

5: less than 5 mm

4: 5 mm or more to less than 10 mm

3: 10 mm or more to less than 20 mm

2: 20 mm or more to less than 30 mm

1: 30 mm or more

The paint coat image clarity was evaluated by cutting a plated steel sheet into a size of 150 mm×70 mm, subjecting the steel sheet to chemical conversion treatment and painting, and then using image distinctness measuring instrument (made by Suga Test Instruments Co., Ltd.). A phosphate, to 2 g/m², was applied as the chemical conversion treatment and the cathodic electrodeposition painting of 20 μm and polyester intermediate and finish coats to 35 μm each were applied as the painting. The paint coat image clarity was evaluated by measuring the NSIC and scoring it in accordance with the following criterion. The mark 3 was judged to be acceptable.

3: 85 or more

2: 70 or more to less than 85

1: less than 70

The results of the evaluations are shown in Tables 2 and 3.

For example, in the cases of Nos. 56 and 60, the contents of Ca, Be, Ti, Cu, Ni, Co, Cr and Mn in the plated layers were outside the ranges stipulated in the present invention and, as a result, the post-painting corrosion resistance was unacceptable. In the case of No. 57, the contents of Mg, Al, Si, Ca, Be, Ti, Cu, Ni, Co, Cr and Mn in the plated layer were outside the ranges stipulated in the present invention and resultantly the post-painting corrosion resistance was unacceptable. In the case of No. 58, the content of Al in the plated layer was outside the range stipulated in the present invention and, as a result, the post-painting corrosion resistance was unacceptable. In the case of No. 59, the contents of Mg, Si, Ca, Be, Ti, Cu, Ni, Co, Cr and Mn in the plated layer were outside the ranges stipulated in the present invention and resultantly the post-painting corrosion resistance was unacceptable. In all the other cases, good post-painting corrosion resistance and brightness were obtained.

TABLE 2

| | Hot dip galvanized layer composition (mass %) | | | | | | | | | | | Surface roughness | | P-painting corrosion | | |
| --- | --- | --- | --- | --- | --- | --- | --- | --- | --- | --- | --- | --- | --- | --- | --- | --- |
| No. | Mg | Al | Si | Ca | Be | Ti | Cu | Ni | Co | Cr | Mn | Ra | $W_{CA}$ | resistance | Brightness | Remarks |
| 1 | 3 | 11 | 0.15 | 0.05 | | | | | | | | 0.7 | 0.6 | 5 | 3 | Invention |
| 2 | 3 | 11 | 0.15 | | 0.03 | | | | | | | 0.7 | 0.6 | 5 | 3 | Invention |
| 3 | 3 | 11 | 0.15 | | | 0.03 | | | | | | 0.7 | 0.6 | 5 | 3 | Invention |
| 4 | 3 | 11 | 0.15 | | | 0.01 | | | | | | 0.7 | 0.6 | 5 | 3 | Invention |
| 5 | 3 | 11 | 0.15 | | | 0.05 | | | | | | 0.7 | 0.6 | 5 | 3 | Invention |
| 6 | 3 | 11 | 0.15 | | | | 0.31 | | | | | 0.7 | 0.6 | 5 | 3 | Invention |
| 7 | 3 | 11 | 0.15 | | | | | 0.03 | | | | 0.7 | 0.6 | 5 | 3 | Invention |
| 8 | 3 | 11 | 0.15 | | | | | 0.01 | | | | 0.7 | 0.6 | 5 | 3 | Invention |
| 9 | 3 | 11 | 0.15 | | | | | 0.08 | | | | 0.7 | 0.6 | 5 | 3 | Invention |
| 10 | 3 | 11 | 0.15 | | | | | | 0.04 | | | 0.7 | 0.6 | 5 | 3 | Invention |
| 11 | 3 | 11 | 0.15 | | | | | | 0.01 | | | 0.7 | 0.6 | 5 | 3 | Invention |
| 12 | 3 | 11 | 0.15 | | | | | | 0.05 | | | 0.7 | 0.6 | 5 | 3 | Invention |
| 13 | 3 | 11 | 0.15 | | | | | | | 0.03 | | 0.7 | 0.6 | 5 | 3 | Invention |
| 14 | 3 | 11 | 0.15 | | | | | | | 0.01 | | 0.7 | 0.6 | 5 | 3 | Invention |
| 15 | 3 | 11 | 0.15 | | | | | | | | 0.03 | 0.7 | 0.6 | 5 | 3 | Invention |
| 16 | 3 | 11 | 0.15 | | | | | | | | 0.01 | 0.7 | 0.6 | 5 | 3 | Invention |
| 17 | 3 | 11 | 0.15 | | | | | | | | 0.1 | 0.7 | 0.6 | 5 | 3 | Invention |
| 18 | 3 | 11 | 0.15 | 0.02 | 0.02 | | | | | | | 0.7 | 0.6 | 5 | 3 | Invention |
| 19 | 3 | 11 | 0.15 | 0.02 | | 0.02 | | | | | | 0.7 | 0.6 | 5 | 3 | Invention |
| 20 | 3 | 11 | 0.15 | 0.02 | | | 0.2 | | | | | 0.7 | 0.6 | 5 | 3 | Invention |
| 21 | 3 | 11 | 0.15 | 0.02 | | | | 0.02 | | | | 0.7 | 0.6 | 5 | 3 | Invention |
| 22 | 3 | 11 | 0.15 | 0.02 | | | | | 0.02 | | | 0.7 | 0.6 | 5 | 3 | Invention |
| 23 | 3 | 11 | 0.15 | 0.02 | | | | | | 0.02 | | 0.7 | 0.6 | 5 | 3 | Invention |
| 24 | 3 | 11 | 0.15 | 0.02 | | | | | | | 0.02 | 0.7 | 0.6 | 5 | 3 | Invention |
| 25 | 3 | 11 | 0.15 | | 0.02 | 0.02 | | | | | | 0.7 | 0.6 | 5 | 3 | Invention |
| 26 | 3 | 11 | 0.15 | | 0.02 | | 0.2 | | | | | 0.7 | 0.6 | 5 | 3 | Invention |
| 27 | 3 | 11 | 0.15 | | 0.02 | | | 0.02 | | | | 0.7 | 0.6 | 5 | 3 | Invention |
| 28 | 3 | 11 | 0.15 | | 0.02 | | | | 0.02 | | | 0.7 | 0.6 | 5 | 3 | Invention |
| 29 | 3 | 11 | 0.15 | | 0.02 | | | | | 0.02 | | 0.7 | 0.6 | 5 | 3 | Invention |
| 30 | 3 | 11 | 0.15 | | 0.02 | | | | | | 0.02 | 0.7 | 0.6 | 5 | 3 | Invention |
| 31 | 3 | 11 | 0.15 | | | 0.02 | 0.2 | | | | | 0.7 | 0.6 | 5 | 3 | Invention |
| 32 | 3 | 11 | 0.15 | | | 0.02 | | 0.02 | | | | 0.7 | 0.6 | 5 | 3 | Invention |
| 33 | 3 | 11 | 0.15 | | | 0.02 | | | 0.02 | | | 0.7 | 0.6 | 5 | 3 | Invention |

TABLE 3

| | Hot dip galvanized layer composition (mass %) | | | | | | | | | | | Surface roughness | | P-painting corrosion | | |
| --- | --- | --- | --- | --- | --- | --- | --- | --- | --- | --- | --- | --- | --- | --- | --- | --- |
| No. | Mg | Al | Si | Ca | Be | Ti | Cu | Ni | Co | Cr | Mn | Ra | $W_{CA}$ | resistance | Brightness | Remarks |
| 34 | 3 | 11 | 0.15 | | | 0.02 | | | | 0.02 | | 0.7 | 0.6 | 5 | 3 | Invention |
| 35 | 3 | 11 | 0.15 | | | 0.02 | | | | | 0.02 | 0.7 | 0.6 | 5 | 3 | Invention |
| 36 | 3 | 11 | 0.15 | | | | 0.2 | 0.02 | | | | 0.7 | 0.6 | 5 | 3 | Invention |
| 37 | 3 | 11 | 0.15 | | | | 0.2 | | 0.02 | | | 0.7 | 0.6 | 5 | 3 | Invention |
| 38 | 3 | 11 | 0.15 | | | | 0.2 | | | 0.02 | | 0.7 | 0.6 | 5 | 3 | Invention |
| 39 | 3 | 11 | 0.15 | | | | 0.2 | | | | 0.02 | 0.7 | 0.6 | 5 | 3 | Invention |
| 40 | 3 | 11 | 0.15 | | | | | 0.02 | 0.02 | | | 0.7 | 0.6 | 5 | 3 | Invention |
| 41 | 3 | 11 | 0.15 | | | | | 0.02 | | 0.02 | | 0.7 | 0.6 | 5 | 3 | Invention |
| 42 | 3 | 11 | 0.15 | | | | | 0.02 | | | 0.02 | 0.7 | 0.6 | 5 | 3 | Invention |
| 43 | 3 | 11 | 0.15 | | | | | | 0.02 | 0.02 | | 0.7 | 0.6 | 5 | 3 | Invention |
| 44 | 3 | 11 | 0.15 | | | | | | 0.02 | | 0.02 | 0.7 | 0.6 | 5 | 3 | Invention |
| 45 | 3 | 11 | 0.15 | | | | | | | 0.02 | 0.02 | 0.7 | 0.6 | 5 | 3 | Invention |
| 46 | 3 | 11 | 0.15 | 0.02 | 0.02 | | | 0.02 | | | | 0.7 | 0.6 | 5 | 3 | Invention |
| 47 | 3 | 11 | 0.15 | | | | | 0.02 | 0.02 | | 0.02 | 0.7 | 0.6 | 5 | 3 | Invention |
| 48 | 3 | 11 | 0.15 | | 0.02 | | 0.2 | | 0.02 | | | 0.7 | 0.6 | 5 | 3 | Invention |
| 49 | 3 | 11 | 0.15 | 0.02 | | 0.02 | | | 0.02 | | | 0.7 | 0.6 | 5 | 3 | Invention |
| 50 | 3 | 11 | 0.15 | 0.02 | 0.02 | 0.02 | 0.2 | 0.02 | 0.02 | 0.02 | 0.02 | 0.7 | 0.6 | 5 | 3 | Invention |
| 51 | 4 | 8 | 0.25 | | | 0.02 | 0.2 | | | | 0.02 | 0.7 | 0.6 | 5 | 3 | Invention |

TABLE 3-continued

| | Hot dip galvanized layer composition (mass %) | | | | | | | | | | Surface roughness | | P-painting corrosion | | |
|---|---|---|---|---|---|---|---|---|---|---|---|---|---|---|---|
| No. | Mg | Al | Si | Ca | Be | Ti | Cu | Ni | Co | Cr | Mn | Ra | $W_{CA}$ | resistance | Brightness | Remarks |
| 52 | 5 | 10 | 0.3 | 0.02 | | | 0.2 | | | 0.02 | | 0.7 | 0.6 | 5 | 3 | Invention |
| 53 | 6 | 4 | 0.12 | | 0.02 | | | | 0.02 | | 0.02 | 0.7 | 0.6 | 4 | 3 | Invention |
| 54 | 5 | 15 | 1.5 | | | 0.02 | | 0.02 | | 0.02 | | 0.7 | 0.6 | 4 | 3 | Invention |
| 55 | 1 | 2 | 0.06 | 0.02 | | | | 0.02 | 0.02 | | | 0.7 | 0.6 | 4 | 3 | Invention |
| 56 | 3 | 11 | 0.15 | | | | | | | | | 0.4 | 0.4 | 3 | 3 | Comparative |
| 57 | 0 | 0.2 | 0 | | | | | | | | | 0.7 | 0.6 | 1 | 3 | Comparative |
| 58 | 3 | 20 | 0.6 | | | | | 0.02 | | | | 0.7 | 0.6 | 3 | 3 | Comparative |
| 59 | 0.1 | 5 | 0 | | | | | | | | | 0.7 | 0.6 | 2 | 3 | Comparative |
| 60 | 3 | 6 | 0.005 | | | | | | | | | 0.7 | 0.6 | 3 | 3 | Comparative |
| 61 | 3 | 11 | 0.15 | | 0.0002 | | | | | | | 0.7 | 0.6 | 4 | 3 | Invention |
| 62 | 3 | 11 | 0.15 | | | | | 0.003 | | | | 0.7 | 0.6 | 4 | 3 | Invention |
| 63 | 3 | 11 | 0.15 | | | | | | | 0.0003 | | 0.7 | 0.6 | 4 | 3 | Invention |
| 64 | 3 | 11 | 0.15 | | 0.0002 | | | 0.003 | | | | 0.7 | 0.6 | 4 | 3 | Invention |
| 65 | 3 | 11 | 0.15 | | 0.0002 | | | | | 0.0003 | | 0.7 | 0.6 | 4 | 3 | Invention |
| 66 | 3 | 11 | 0.15 | | | | | 0.003 | | 0.0003 | | 0.7 | 0.6 | 4 | 3 | Invention |

EXAMPLE 3

First, cold-rolled steel sheets 0.8 mm in thickness were prepared, and subjected to hot dip plating for three seconds at 400 to 600° C. in a Zn alloy plating bath wherein the amounts of Mg, Al, Si and other added elements were changed and to $N_2$ wiping for adjusting the plated amount to 70 g/m². The chemical compositions of the plated layers of the plated steel sheets thus produced are shown in Tables 4 to 6. Further, the results of observing the metallographic structures of the plated layers on the cross sections of the plated steel sheets with SEM are also shown in Tables 4 to 6.

The plated steel sheets thus produced were cut into the size of 200 mm×200 mm, stretched by 35 mm by using a punch 100 mm in diameter with a spherical head, and thereafter subjected to chemical conversion treatment, painting and the evaluation of corrosion resistance. The phosphate of 2 g/m² was applied as the chemical conversion treatment and the urethane group powder coating of 70 μm was applied as the painting.

Further, the painted steel sheets thus produced were scratched, to reach the substrate steel, with a utility knife and then subjected to SST for 500 hours. The evaluation was made by applying tape exfoliation test to the scratches after corrosion test and scoring in accordance with the following criterion based on the length of the exfoliation of a painted film. The marks 3 to 5 were judged to be acceptable.
5: less than 5 mm
4: 5 mm or more to less than 10 mm
3: 10 mm or more to less than 20 mm
2: 20 mm or more to less than 30 mm
1: 30 mm or more The results of the evaluations are shown in Tables 4 to 6.

In the cases of Nos. 97, 98, 104, 106 and 109, the contents of Mg, Al, Si, Ca, Be, Ti, Cu, Ni, Co, Cr, Mn and $Mg_2Si$ in the plated layers were outside the ranges stipulated in the present invention and resultantly the post-painting corrosion resistance was acceptable. All the other cases showed good post-painting corrosion resistance and the cases where $Mg_2Si$ was contained in the plated layers showed particularly good corrosion resistance.

TABLE 4

| | Hot dip galvanized layer composition (mass %) | | | | | | | | | | | $Mg_2Si$ | Ternary | Al | Zn | $MgZn_2$ | Corrosion | |
|---|---|---|---|---|---|---|---|---|---|---|---|---|---|---|---|---|---|---|
| No. | Mg | Al | Si | Ca | Be | Ti | Cu | Ni | Co | Cr | Mn | Si phase | phase | eutectic | phase | phase | phase | resistance | Remarks |
| 1 | 1 | 2 | 0.06 | 0.05 | | | | | | | | | ∴ | | ∴ | | ∴ | 4 | Invention examples |
| 2 | 1 | 19 | 0.6 | 0.05 | | | | | | | | | ∴ | | ∴ | ∴ | | 4 | |
| 3 | 3 | 5 | 0.15 | 0.05 | | | | | | | | | | ∴ | ∴ | ∴ | ∴ | 5 | |
| 4 | 4 | 8 | 0.25 | 0.05 | | | | | | | | | | ∴ | ∴ | ∴ | ∴ | 5 | |
| 5 | 5 | 10 | 0.3 | 0.05 | | | | | | | | | | ∴ | ∴ | ∴ | ∴ | 5 | |
| 6 | 5 | 15 | 0.45 | 0.05 | | | | | | | | | | ∴ | ∴ | ∴ | ∴ | 5 | |
| 7 | 5 | 15 | 1.5 | 0.05 | | | | | | | | | | ∴ | ∴ | ∴ | | 5 | |
| 8 | 6 | 2 | 0.06 | 0.05 | | | | | | | | | ∴ | | ∴ | ∴ | ∴ | 4 | |
| 9 | 6 | 4 | 0.12 | 0.05 | | | | | | | | | | ∴ | | ∴ | ∴ | 5 | |
| 10 | 10 | 2 | 0.06 | 0.05 | | | | | | | | | ∴ | | ∴ | ∴ | ∴ | 4 | |
| 11 | 10 | 10 | 0.3 | 0.05 | | | | | | | | | | ∴ | ∴ | ∴ | ∴ | 5 | |
| 12 | 3 | 6 | 0.1 | 0.05 | | | | | | | | | | ∴ | ∴ | ∴ | | 5 | |
| 13 | 1 | 2 | 0.06 | | 0.03 | | | | | | | | ∴ | | ∴ | | ∴ | 4 | |
| 14 | 1 | 19 | 0.6 | | 0.03 | | | | | | | | ∴ | | ∴ | ∴ | | 4 | |
| 15 | 3 | 5 | 0.15 | | 0.03 | | | | | | | | | ∴ | ∴ | ∴ | ∴ | 5 | |
| 16 | 4 | 8 | 0.25 | | 0.03 | | | | | | | | | ∴ | ∴ | ∴ | ∴ | 5 | |
| 17 | 5 | 10 | 0.3 | | 0.03 | | | | | | | | | ∴ | ∴ | ∴ | ∴ | 5 | |
| 18 | 5 | 15 | 0.45 | | 0.03 | | | | | | | | | ∴ | ∴ | ∴ | ∴ | 5 | |
| 19 | 5 | 15 | 1.5 | | 0.03 | | | | | | | | | ∴ | ∴ | ∴ | ∴ | 5 | |
| 20 | 6 | 2 | 0.06 | | 0.03 | | | | | | | | ∴ | | ∴ | ∴ | ∴ | 4 | |
| 21 | 6 | 4 | 0.12 | | 0.03 | | | | | | | | | ∴ | | ∴ | ∴ | 5 | |

TABLE 4-continued

| No. | Mg | Al | Si | Ca | Be | Ti | Cu | Ni | Co | Cr | Mn | Si phase | Mg$_2$Si phase | Ternary eutectic | Al phase | Zn phase | MgZn$_2$ phase | Corrosion resistance | Remarks |
|---|---|---|---|---|---|---|---|---|---|---|---|---|---|---|---|---|---|---|---|
| 22 | 10 | 2 | 0.06 | | 0.03 | | | | | | | ∴ | | | ∴ | ∴ | ∴ | 4 | |
| 23 | 10 | 10 | 0.3 | | 0.03 | | | | | | | | ∴ | | ∴ | ∴ | ∴ | 5 | |
| 24 | 3 | 6 | 0.1 | | 0.03 | | | | | | | | ∴ | | ∴ | ∴ | ∴ | 5 | |
| 25 | 1 | 2 | 0.06 | | | 0.03 | | | | | | ∴ | | | ∴ | ∴ | | 4 | |
| 26 | 1 | 19 | 0.6 | | | 0.03 | | | | | | ∴ | | | ∴ | ∴ | | 4 | |
| 27 | 3 | 5 | 0.15 | | | 0.03 | | | | | | | ∴ | | ∴ | ∴ | | 5 | |
| 28 | 4 | 8 | 0.25 | | | 0.03 | | | | | | | ∴ | | ∴ | ∴ | ∴ | 5 | |
| 29 | 5 | 10 | 0.3 | | | 0.03 | | | | | | | ∴ | | ∴ | ∴ | ∴ | 5 | |
| 30 | 5 | 15 | 0.45 | | | 0.03 | | | | | | | ∴ | | ∴ | ∴ | ∴ | 5 | |
| 31 | 5 | 15 | 1.5 | | | 0.03 | | | | | | | ∴ | | ∴ | ∴ | | 5 | |
| 32 | 6 | 2 | 0.06 | | | 0.03 | | | | | | ∴ | | | | ∴ | ∴ | 4 | |
| 33 | 6 | 4 | 0.12 | | | 0.03 | | | | | | | ∴ | | | ∴ | ∴ | 5 | |
| 34 | 10 | 2 | 0.06 | | | 0.03 | | | | | | ∴ | | | | ∴ | ∴ | 4 | |
| 35 | 10 | 10 | 0.3 | | | 0.03 | | | | | | | ∴ | | ∴ | | ∴ | 5 | |
| 36 | 3 | 6 | 0.1 | | | 0.03 | | | | | | | ∴ | | ∴ | ∴ | | 5 | |
| 37 | 1 | 2 | 0.06 | | | | 0.31 | | | | | ∴ | | | ∴ | ∴ | | 4 | |
| 38 | 1 | 19 | 0.6 | | | | 0.31 | | | | | ∴ | | | ∴ | ∴ | | 4 | |
| 39 | 3 | 5 | 0.15 | | | | 0.31 | | | | | | ∴ | | ∴ | ∴ | | 5 | |
| 40 | 4 | 8 | 0.25 | | | | 0.31 | | | | | | ∴ | | ∴ | ∴ | ∴ | 5 | |
| 41 | 5 | 10 | 0.3 | | | | 0.31 | | | | | | ∴ | | ∴ | ∴ | ∴ | 5 | |
| 42 | 5 | 15 | 0.45 | | | | 0.31 | | | | | | ∴ | | ∴ | ∴ | ∴ | 5 | |
| 43 | 5 | 15 | 1.5 | | | | 0.31 | | | | | | ∴ | | ∴ | ∴ | | 5 | |
| 44 | 6 | 2 | 0.06 | | | | 0.31 | | | | | ∴ | | | | ∴ | ∴ | 4 | |
| 45 | 6 | 4 | 0.12 | | | | 0.31 | | | | | | ∴ | | | ∴ | ∴ | 5 | |
| 46 | 10 | 2 | 0.06 | | | | 0.31 | | | | | ∴ | | | | ∴ | ∴ | 4 | |
| 47 | 10 | 10 | 0.3 | | | | 0.31 | | | | | | ∴ | | ∴ | | ∴ | 5 | |
| 48 | 3 | 6 | 0.1 | | | | 0.31 | | | | | | ∴ | | ∴ | ∴ | | 5 | |
| 49 | 1 | 2 | 0.06 | | | | | 0.03 | | | | ∴ | | | ∴ | ∴ | | 4 | |
| 50 | 1 | 19 | 0.6 | | | | | 0.03 | | | | ∴ | | | ∴ | ∴ | | 4 | |

TABLE 5

| No. | Mg | Al | Si | Ca | Be | Ti | Cu | Ni | Co | Cr | Mn | Si phase | Mg$_2$Si phase | Ternary eutectic | Al phase | Zn phase | MgZn$_2$ phase | Corrosion resistance | Remarks |
|---|---|---|---|---|---|---|---|---|---|---|---|---|---|---|---|---|---|---|---|
| 51 | 3 | 5 | 0.15 | | | | | 0.03 | | | | | ∴ | | ∴ | ∴ | | 5 | Invention |
| 52 | 4 | 8 | 0.25 | | | | | 0.03 | | | | | ∴ | | ∴ | ∴ | ∴ | 5 | Invention |
| 53 | 5 | 10 | 0.3 | | | | | 0.03 | | | | | ∴ | | ∴ | ∴ | ∴ | 5 | Invention |
| 54 | 5 | 15 | 0.45 | | | | | 0.03 | | | | | ∴ | | ∴ | ∴ | ∴ | 5 | Invention |
| 55 | 5 | 15 | 1.5 | | | | | 0.03 | | | | | ∴ | | ∴ | ∴ | | 5 | Invention |
| 56 | 6 | 2 | 0.06 | | | | | 0.03 | | | | ∴ | | | | ∴ | ∴ | 4 | Invention |
| 57 | 6 | 4 | 0.12 | | | | | 0.03 | | | | | ∴ | | | ∴ | ∴ | 5 | Invention |
| 58 | 10 | 2 | 0.06 | | | | | 0.03 | | | | ∴ | | | | ∴ | ∴ | 4 | Invention |
| 59 | 10 | 10 | 0.3 | | | | | 0.03 | | | | | ∴ | | ∴ | | ∴ | 5 | Invention |
| 60 | 3 | 6 | 0.1 | | | | | 0.03 | | | | | ∴ | | ∴ | ∴ | | 5 | Invention |
| 61 | 1 | 2 | 0.06 | | | | | | 0.04 | | | ∴ | | | ∴ | ∴ | | 4 | Invention |
| 62 | 1 | 19 | 0.6 | | | | | | 0.04 | | | ∴ | | | ∴ | ∴ | | 4 | Invention |
| 63 | 3 | 5 | 0.15 | | | | | | 0.04 | | | | ∴ | | ∴ | ∴ | | 5 | Invention |
| 64 | 4 | 8 | 0.25 | | | | | | 0.04 | | | | ∴ | | ∴ | ∴ | ∴ | 5 | Invention |
| 65 | 5 | 10 | 0.3 | | | | | | 0.04 | | | | ∴ | | ∴ | ∴ | ∴ | 5 | Invention |
| 66 | 5 | 15 | 0.45 | | | | | | 0.04 | | | | ∴ | | ∴ | ∴ | ∴ | 5 | Invention |
| 67 | 5 | 15 | 1.5 | | | | | | 0.04 | | | | ∴ | | ∴ | ∴ | | 5 | Invention |
| 68 | 6 | 2 | 0.06 | | | | | | 0.04 | | | ∴ | | | | ∴ | ∴ | 4 | Invention |
| 69 | 6 | 4 | 0.12 | | | | | | 0.04 | | | | ∴ | | | ∴ | ∴ | 5 | Invention |
| 70 | 10 | 2 | 0.06 | | | | | | 0.04 | | | ∴ | | | | ∴ | ∴ | 4 | Invention |
| 71 | 10 | 10 | 0.3 | | | | | | 0.04 | | | | ∴ | | ∴ | | ∴ | 5 | Invention |
| 72 | 3 | 6 | 0.1 | | | | | | 0.04 | | | | ∴ | | ∴ | ∴ | | 5 | Invention |
| 73 | 1 | 2 | 0.06 | | | | | | | 0.03 | | ∴ | | | ∴ | ∴ | | 4 | Invention |
| 74 | 1 | 19 | 0.6 | | | | | | | 0.03 | | ∴ | | | ∴ | ∴ | | 4 | Invention |
| 75 | 3 | 5 | 0.15 | | | | | | | 0.03 | | | ∴ | | ∴ | ∴ | | 5 | Invention |
| 76 | 4 | 8 | 0.25 | | | | | | | 0.03 | | | ∴ | | ∴ | ∴ | ∴ | 5 | Invention |
| 77 | 5 | 10 | 0.3 | | | | | | | 0.03 | | | ∴ | | ∴ | ∴ | ∴ | 5 | Invention |
| 78 | 5 | 15 | 0.45 | | | | | | | 0.03 | | | ∴ | | ∴ | ∴ | ∴ | 5 | Invention |
| 79 | 5 | 15 | 1.5 | | | | | | | 0.03 | | | ∴ | | ∴ | ∴ | | 5 | Invention |
| 80 | 6 | 2 | 0.06 | | | | | | | 0.03 | | ∴ | | | | ∴ | ∴ | 4 | Invention |
| 81 | 6 | 4 | 0.12 | | | | | | | 0.03 | | | ∴ | | | ∴ | ∴ | 5 | Invention |
| 82 | 10 | 2 | 0.06 | | | | | | | 0.03 | | ∴ | | | | ∴ | ∴ | 4 | Invention |
| 83 | 10 | 10 | 0.3 | | | | | | | 0.03 | | | ∴ | | ∴ | | ∴ | 5 | Invention |
| 84 | 3 | 6 | 0.1 | | | | | | | 0.03 | | | ∴ | | ∴ | ∴ | | 5 | Invention |
| 85 | 1 | 2 | 0.06 | | | | | | | | 0.03 | ∴ | | | ∴ | ∴ | | 4 | Invention |
| 86 | 1 | 19 | 0.6 | | | | | | | | 0.03 | ∴ | | | ∴ | ∴ | | 4 | Invention |

TABLE 5-continued

| No. | Mg | Al | Si | Ca | Be | Ti | Cu | Ni | Co | Cr | Mn | Si phase | Mg₂Si phase | Ternary eutectic | Al phase | Zn phase | MgZn₂ phase | Corrosion resistance | Remarks |
|---|---|---|---|---|---|---|---|---|---|---|---|---|---|---|---|---|---|---|---|
| 87 | 3 | 5 | 0.15 | | | | | | | | 0.03 | | ∴ | ∴ | ∴ | ∴ | | 5 | Invention |
| 88 | 4 | 8 | 0.25 | | | | | | | | 0.03 | | ∴ | ∴ | ∴ | ∴ | ∴ | 5 | Invention |
| 89 | 5 | 10 | 0.3 | | | | | | | | 0.03 | | ∴ | ∴ | ∴ | ∴ | ∴ | 5 | Invention |
| 90 | 5 | 15 | 0.45 | | | | | | | | 0.03 | | ∴ | ∴ | ∴ | | ∴ | 5 | Invention |
| 91 | 5 | 15 | 1.5 | | | | | | | | 0.03 | | ∴ | ∴ | ∴ | | ∴ | 5 | Invention |
| 92 | 6 | 2 | 0.06 | | | | | | | | 0.03 | ∴ | | ∴ | | ∴ | ∴ | 4 | Invention |
| 93 | 6 | 4 | 0.12 | | | | | | | | 0.03 | | ∴ | ∴ | | ∴ | ∴ | 5 | Invention |
| 94 | 10 | 2 | 0.06 | | | | | | | | 0.03 | ∴ | | ∴ | | ∴ | ∴ | 4 | Invention |
| 95 | 10 | 10 | 0.3 | | | | | | | | 0.03 | | ∴ | ∴ | ∴ | | ∴ | 5 | Invention |
| 96 | 3 | 6 | 0.1 | | | | | | | | 0.03 | | ∴ | ∴ | ∴ | ∴ | | 5 | Invention |
| 97 | 1 | 2 | 0.06 | | | | | | | ∴ | | | | ∴ | | ∴ | | 2 | Comparative |
| 98 | 1 | 19 | 0.6 | | | | | | | ∴ | | | | ∴ | ∴ | | | 2 | Comparative |
| 99 | 3 | 5 | 0.15 | | | | | | | | | | ∴ | ∴ | ∴ | ∴ | | 3 | Invention |
| 100 | 4 | 8 | 0.25 | | | | | | | | | | ∴ | ∴ | ∴ | ∴ | ∴ | 3 | Invention |

TABLE 6

| No. | Mg | Al | Si | Ca | Be | Ti | Cu | Ni | Co | Cr | Mn | Si phase | Mg₂Si phase | Ternary eutectic | Al phase | Zn phase | MgZn₂ phase | Corrosion resistance | Remarks |
|---|---|---|---|---|---|---|---|---|---|---|---|---|---|---|---|---|---|---|---|
| 101 | 5 | 10 | 0.3 | | | | | | | | | | ∴ | ∴ | ∴ | ∴ | ∴ | 3 | Invention |
| 102 | 5 | 15 | 0.45 | | | | | | | | | | ∴ | ∴ | ∴ | | ∴ | 3 | Invention |
| 103 | 5 | 15 | 1.5 | | | | | | | | | | ∴ | ∴ | ∴ | | ∴ | 3 | Invention |
| 104 | 6 | 2 | 0.06 | | | | | | | | | ∴ | | ∴ | | ∴ | ∴ | 2 | Comparative |
| 105 | 6 | 4 | 0.12 | | | | | | | | | | ∴ | ∴ | | ∴ | ∴ | 3 | Invention |
| 106 | 10 | 2 | 0.06 | | | | | | | | | ∴ | | ∴ | | ∴ | ∴ | 2 | Comparative |
| 107 | 10 | 10 | 0.3 | | | | | | | | | | ∴ | ∴ | ∴ | | ∴ | 3 | Invention |
| 108 | 3 | 6 | 0.1 | | | | | | | | | | ∴ | ∴ | ∴ | ∴ | | 3 | Invention |
| 109 | 5 | 10 | | | | | | | | | | | | ∴ | ∴ | | ∴ | 2 | Comparative |
| 110 | 3 | 6 | 0.005 | | | | | | | | | | ∴ | ∴ | ∴ | ∴ | | 3 | Invention |
| 111 | 1 | 2 | 0.06 | | | 0.0002 | | | | | | ∴ | | ∴ | | ∴ | | 4 | Invention |
| 112 | 1 | 19 | 0.6 | | | 0.0002 | | | | | | ∴ | | ∴ | ∴ | | | 4 | Invention |
| 113 | 3 | 5 | 0.15 | | | 0.0002 | | | | | | | ∴ | ∴ | ∴ | ∴ | | 5 | Invention |
| 114 | 4 | 8 | 0.25 | | | 0.0002 | | | | | | | ∴ | ∴ | ∴ | ∴ | ∴ | 5 | Invention |
| 115 | 5 | 10 | 0.3 | | | 0.0002 | | | | | | | ∴ | ∴ | ∴ | ∴ | ∴ | 5 | Invention |
| 116 | 5 | 15 | 0.45 | | | 0.0002 | | | | | | | ∴ | ∴ | ∴ | | ∴ | 5 | Invention |
| 117 | 5 | 15 | 1.5 | | | 0.0002 | | | | | | | ∴ | ∴ | ∴ | | ∴ | 5 | Invention |
| 118 | 6 | 2 | 0.06 | | | 0.0002 | | | | | | ∴ | | ∴ | | ∴ | ∴ | 4 | Invention |
| 119 | 6 | 4 | 0.12 | | | 0.0002 | | | | | | | ∴ | ∴ | | ∴ | ∴ | 5 | Invention |
| 120 | 10 | 2 | 0.06 | | | 0.0002 | | | | | | ∴ | | ∴ | | ∴ | ∴ | 4 | Invention |
| 121 | 10 | 10 | 0.3 | | | 0.0002 | | | | | | | ∴ | ∴ | ∴ | | ∴ | 5 | Invention |
| 122 | 3 | 6 | 0.1 | | | 0.0002 | | | | | | | ∴ | ∴ | ∴ | ∴ | | 5 | Invention |
| 123 | 1 | 2 | 0.06 | | | | | 0.003 | | | | ∴ | | ∴ | | ∴ | | 4 | Invention |
| 124 | 1 | 19 | 0.6 | | | | | 0.003 | | | | ∴ | | ∴ | ∴ | | | 4 | Invention |
| 125 | 3 | 5 | 0.15 | | | | | 0.003 | | | | | ∴ | ∴ | ∴ | ∴ | | 5 | Invention |
| 126 | 4 | 8 | 0.25 | | | | | 0.003 | | | | | ∴ | ∴ | ∴ | ∴ | ∴ | 5 | Invention |
| 127 | 5 | 10 | 0.3 | | | | | 0.003 | | | | | ∴ | ∴ | ∴ | ∴ | ∴ | 5 | Invention |
| 128 | 5 | 15 | 0.45 | | | | | 0.003 | | | | | ∴ | ∴ | ∴ | | ∴ | 5 | Invention |
| 129 | 5 | 15 | 1.5 | | | | | 0.003 | | | | | ∴ | ∴ | ∴ | | ∴ | 5 | Invention |
| 130 | 6 | 2 | 0.06 | | | | | 0.003 | | | | ∴ | | ∴ | | ∴ | ∴ | 4 | Invention |
| 131 | 6 | 4 | 0.12 | | | | | 0.003 | | | | | ∴ | ∴ | | ∴ | ∴ | 5 | Invention |
| 132 | 10 | 2 | 0.06 | | | | | 0.003 | | | | ∴ | | ∴ | | ∴ | ∴ | 4 | Invention |
| 133 | 10 | 10 | 0.3 | | | | | 0.003 | | | | | ∴ | ∴ | ∴ | | ∴ | 5 | Invention |
| 134 | 3 | 6 | 0.1 | | | | | 0.003 | | | | | ∴ | ∴ | ∴ | ∴ | | 5 | Invention |
| 135 | 1 | 2 | 0.06 | | | | | | 0.003 | | | ∴ | | ∴ | | ∴ | | 4 | Invention |
| 136 | 1 | 19 | 0.6 | | | | | | 0.003 | | | ∴ | | ∴ | ∴ | | | 4 | Invention |
| 137 | 3 | 5 | 0.15 | | | | | | 0.003 | | | | ∴ | ∴ | ∴ | ∴ | | 5 | Invention |
| 138 | 4 | 8 | 0.25 | | | | | | 0.003 | | | | ∴ | ∴ | ∴ | ∴ | ∴ | 5 | Invention |
| 139 | 5 | 10 | 0.3 | | | | | | 0.003 | | | | ∴ | ∴ | ∴ | ∴ | ∴ | 5 | Invention |
| 140 | 5 | 15 | 0.45 | | | | | | 0.003 | | | | ∴ | ∴ | ∴ | | ∴ | 5 | Invention |
| 141 | 5 | 15 | 1.5 | | | | | | 0.003 | | | | ∴ | ∴ | ∴ | | ∴ | 5 | Invention |
| 142 | 6 | 2 | 0.06 | | | | | | 0.003 | | | ∴ | | ∴ | | ∴ | ∴ | 4 | Invention |
| 143 | 6 | 4 | 0.12 | | | | | | 0.003 | | | | ∴ | ∴ | | ∴ | ∴ | 5 | Invention |
| 144 | 10 | 2 | 0.06 | | | | | | 0.003 | | | ∴ | | ∴ | | ∴ | ∴ | 4 | Invention |
| 145 | 10 | 10 | 0.3 | | | | | | 0.003 | | | | ∴ | ∴ | ∴ | | ∴ | 5 | Invention |
| 146 | 3 | 6 | 0.1 | | | | | | 0.003 | | | | ∴ | ∴ | ∴ | ∴ | | 5 | Invention |

Exemplary embodiment of the present invention enable a production of a plated steel sheet which is excellent in corrosion resistance and paint coat image clarity when it is used after being processed and painted.

The invention claimed is:

1. A galvanized steel sheet with a particular post-painting corrosion resistance and a particular paint coat image clarity, comprising:
   at least one steel sheet portion; and
   a galvanized layer provided on a surface of the at least one steel sheet portion, the galvanized layer, consisting essentially of in mass, 1-10% of Mg, 2-19% of Al and 0.001-2% of Si, with a balance of Zn and unavoidable impurities
   wherein the galvanized steel sheet has a center line average roughness (Ra) that is at most 1.0 μm and a filtered waviness curve ($W_{CA}$) that is at most 0.8 μm.

2. The galvanized steel sheet according to claim 1, wherein the galvanized layer further consists essentially of at least one element which includes, in mass, at least one of 0.01-0.5% of Ca, 0.01-0.2% of Be, 0.0001-0.2% of Ti, 0.1-10% of Cu, 0.001-0.2% of Ni, 0.01-0.3% of Co, 0.0001-0.2% of Cr and 0.01-0.5% of Mn.

3. The galvanized steel sheet according to claim 1, wherein the galvanized layer includes a metallographic structure which has an [$Mg_2Si$ phase], a [$Zn_2Mg$ phase] and a [Zn phase] that coexist in a substrate of an [Al/Zn/$Zn_2Mg$ ternary eutectic structure].

4. The galvanized steel sheet according to claim 1, wherein the galvanized layer includes a metallographic structure which has an [$Mg_2Si$ phase], a [$Zn_2Mg$ phase] and an [Al phase] that coexist in a substrate of an [Al/Zn/$Zn_2Mg$ ternary eutectic structure].

5. The galvanized steel sheet according to claim 1, wherein the galvanized layer includes a metallographic structure which has an [$Mg_2Si$ phase], a [$Zn_2Mg$ phase], a [Zn phase] and an [Al phase] that coexist in a substrate of an [Al/Zn/$Zn_2Mg$ ternary eutectic structure].

6. The galvanized steel sheet according to claim 1, wherein the galvanized layer includes a metallographic structure which has an [$Mg_2Si$ phase], a [Zn phase] and an [Al phase] that coexist in a substrate of an [Al/Zn/$Zn_2Mg$ ternary eutectic structure].

* * * * *